May 14, 1940. H. T. RINGROSE 2,201,055
APPARATUS FOR INDICATING THE PRESENCE OF INFLAMMABLE VAPORS OR GASES
Filed July 27, 1937 4 Sheets-Sheet 1

Inventor
Henry T. Ringrose.
Cushman Darby & Cushman
Attorneys.

May 14, 1940.   H. T. RINGROSE   2,201,055
APPARATUS FOR INDICATING THE PRESENCE OF INFLAMMABLE VAPORS OR GASES
Filed July 27, 1937   4 Sheets-Sheet 2

Inventor,
Henry T. Ringrose.
Cushman, Darby Cushman
Attorneys

Inventor.

Henry T. Ringrose.

Attorneys

May 14, 1940.  H. T. RINGROSE  2,201,055
APPARATUS FOR INDICATING THE PRESENCE OF INFLAMMABLE VAPORS OR GASES
Filed July 27, 1937  4 Sheets—Sheet 4

Inventor,
Henry T. Ringrose.
Cushman Darby Cushman
Attorneys

Patented May 14, 1940

2,201,055

UNITED STATES PATENT OFFICE 2,201,055

APPARATUS FOR INDICATING THE PRESENCE OF INFLAMMABLE VAPORS OR GASES

Henry Thomas Ringrose, West Park, Leeds, England

Application July 27, 1937, Serial No. 156,003
In Great Britain August 1, 1936

2 Claims. (Cl. 177—311)

This invention relates to apparatus more particularly for use in mines for indicating the presence of inflammable vapors or gases, and of the type wherein a vacuum proportional to the amount of inflammable vapor or gas in the atmosphere surrounding a porous vessel, which is capable of maintaining a gas-pressure for a substantial time, is created therein by the combustion of the inflammable vapors or gases which diffuse or are aspirated into said vessel, and in which the vacuum so produced is utilised to break an electric lamp circuit when the percentage of such inflammable vapors or gases reaches a predetermined figure.

In this type of apparatus it has been proposed to provide in the porous vessel an incandescent filament for combustion of the diffused or aspirated gases, and to connect said filament in series with the lamp circuit through contacts controlled by a collapsible diaphragm connected with the interior of the porous vessel.

According to the present invention, the diaphragm controlled contacts are shunted by a resistance of such a value that when the contacts are broken, sufficient current is passed by said resistance as to cause the lamp to glow or to give an appreciably less illumination than normally. This dimming of the light from the lamp indicates the presence of inflammable vapors or gases in excess of the predetermined quantity or proportion, whilst the maintenance of a dimmed light through the provision of the resistance across the diaphragm controlled contacts in the lamp circuit, ensures sufficient light for the miner to see his way out of the danger zone.

In order to enable the apparatus to be tested, means may be provided for delaying the equalisation of pressures between the interior of the diaphragm and that of the porous vessel, and such provision may be in the form of a restricted passage or orifice in the conduit between the diaphragm and vessel, said restricted passage being controlled by a closure which will permit a very slow leakage. Thus when the lamp and the filament in the porous vessel are first turned "on," the lamp will give full luminosity and the interior of the porous vessel will be heated up. If now the lamp and filament be turned "off" the loss of heat in the porous vessel will create a big vacuum and break the contacts, and when the lamp is again turned "on" the current will pass through the resistance until the vacuum is destroyed and the circuit again made, thereby giving a dimmed light prior to full illumination and indicating that the filament and lamp circuit are in order. The greater the restriction or baffling effect between the porous vessel and diaphragm the greater will be the period of operation of the dimmed light resulting from the delayed equalisation of pressures.

In order that the invention may be clearly understood and readily carried into effect, the same will now be more fully described with reference to and by the aid of the embodiment illustrated in the accompanying drawings, wherein—

Figure 1:
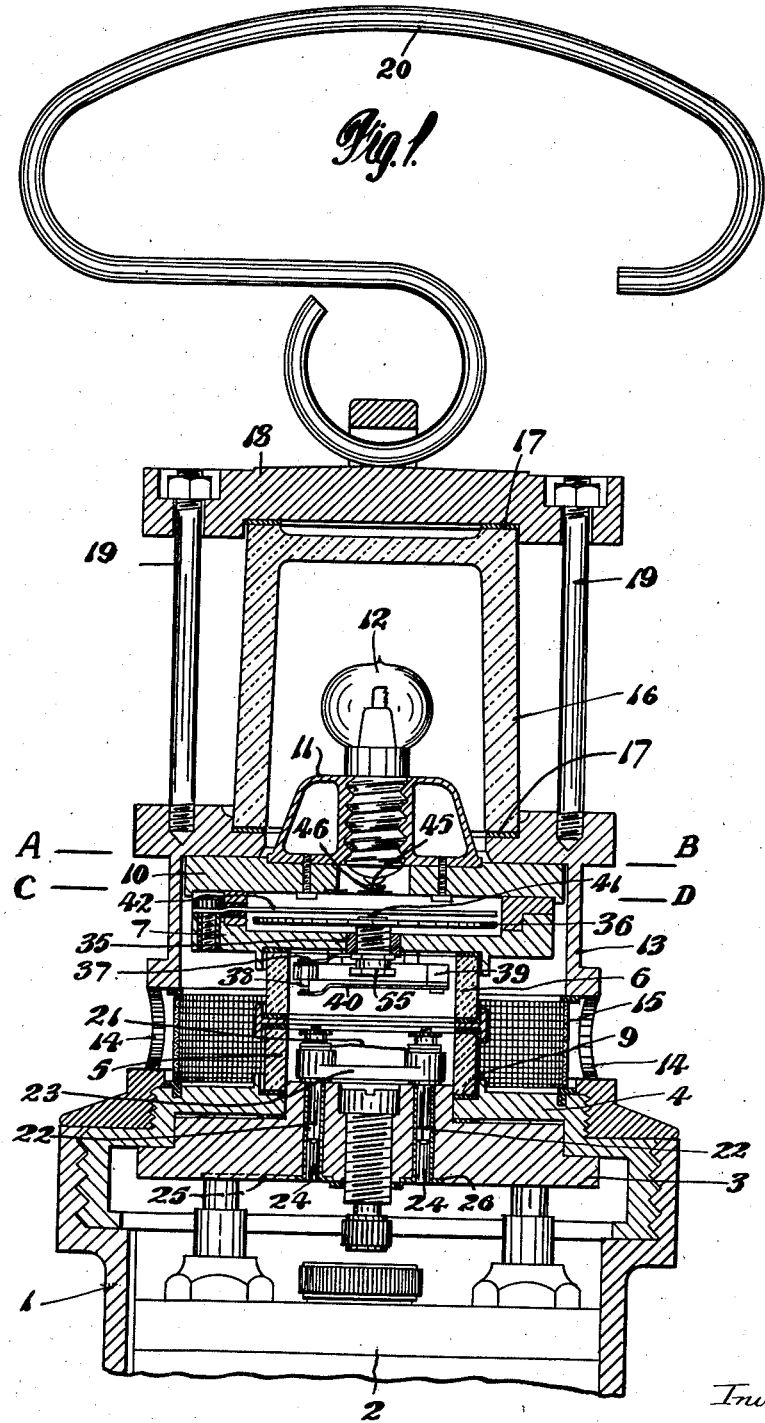
Figures 1 and 2 illustrate in vertical sectional elevations taken at right angles, the upper part of a miner's lamp incorporating an inflammable gas detector or indicator in accordance with the invention.
Figure 2:
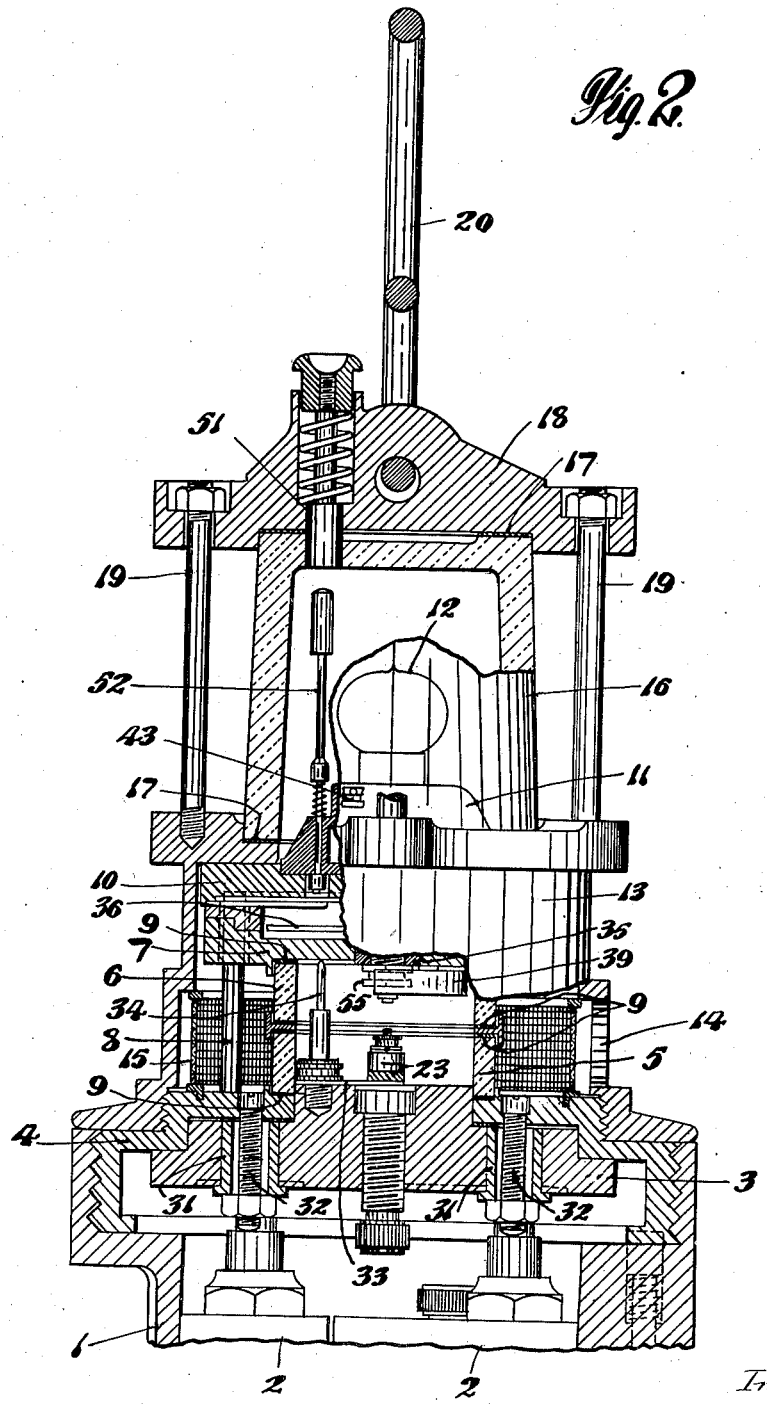
Figure 3:
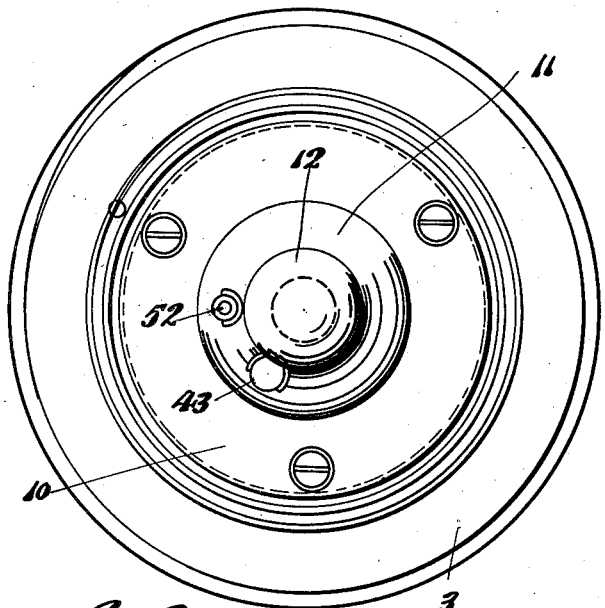
Figure 3 is a plan view taken on the line A. B. of Figure 1 with the lamp glass and associated top structure of the lamp removed.
Figure 5:
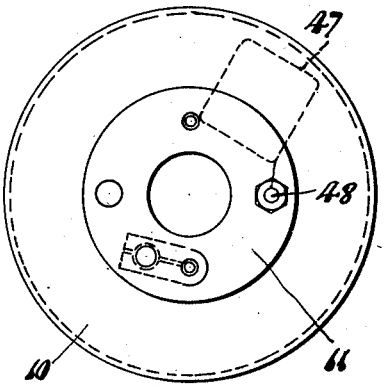
Figures 5 and 6 are respectively a plan and an inverted plan of the top base plate which carries the lamp holder and resistance element.

Referring to the drawings and more particularly to Figures 1 and 2 the apparatus comprises a container 1 which accommodates two 2 volt batteries 2 of different capacities, and said container 1 is closed by a bottom base plate 3 of insulating material which is carried by a flanged metal ring 4 screwing into the mouth of the container 1. The central upstanding part of the bottom base plate 3 affords a plug fitting closure for the bottom of a combustion chamber afforded by a lower cylinder of clear glass 5 and an upper cylindrical porous pot 6, whilst the upper end of the combustion chamber is closed by a recessed metal disc or plate 7 which affords a diaphragm chamber and is secured to the flanged ring 4 by screw clamping pillars 8. Rubber packing rings 9 are interposed between the ends and parts of the combustion chamber to afford gas-tight joints.

The diaphragm chamber is closed by a top base plate 10 of insulating material upon which is mounted a metal holder 11 for a screw-in 4 volt lamp bulb 12, whilst the diaphragm chamber and combustion chamber are enclosed or surrounded by an outer casing 13 which screws down on to the ring 4 and has an annular series of through ports 14 in its lower part to admit the outer atmosphere to the porous wall 6 of the combustion chamber. A gauze ring 15 clamped between an inwardly projecting shoulder on the casing 13 and the top of the ring 4 serves to exclude foreign matter and to protect the wall of the combustion chamber.

The lamp bulb 12 and holder 11 are enclosed by a lamp glass 16 clamped between packing rings 17 by a lamp cap 18 which is connected to the top of the casing 13 by screwed pillars 18, and the lamp cap 19 is fitted with a carrying handle 20.

Within the lower part of the combustion chamber, so that it can be seen through the glass cylinder 5 and the mesh of the gauze ring 15, is a palladium or other filament 21 carried by and between pin type terminals 22 at opposite ends of a mounting bar 23 of insulating material, said pin terminals being plugged into conductor sockets or sleeves 24 which pass through the bottom base plate 3 and are connected to contact strips 25, 26 on the underside thereof and which bear upon the positive and negative terminals respectively of the larger capacity battery cell 2.

Figure 7:
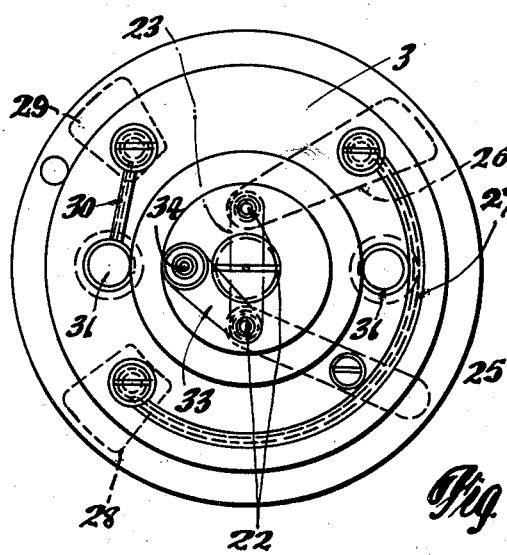
Figures 7 and 8 are respectively a plan and an inverted plan of the bottom base plate which carries the battery contacts and the incandescent filament.
Figure 8:
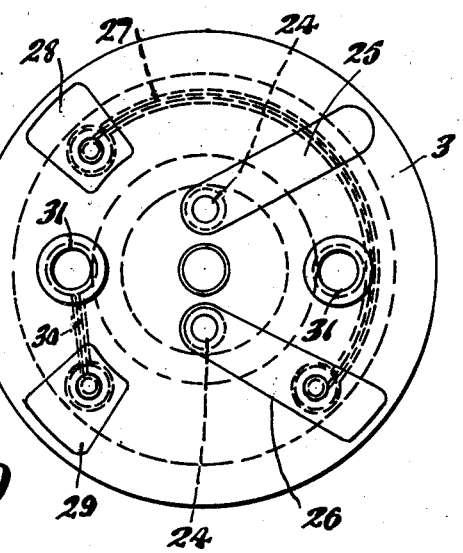
Figure 9:
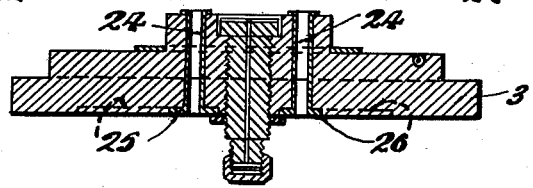
Figure 9 is a sectional side elevation of the bottom base plate.
Figure 10:
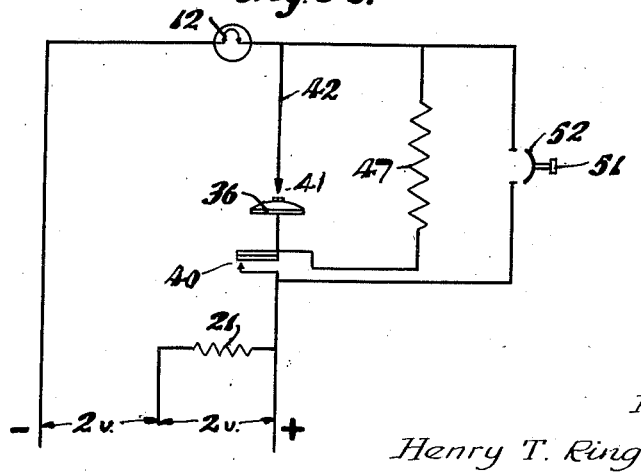
Figure 10 is a theoretical diagram of the electric lamp circuit and its associated resistance and filament circuits.

The negative contact strip 26 is connected by an insulated lead 27, let into the upper face of the plate 3 and sealed therein, to a positive contact plate 28 for the other battery cell, and a further negative contact plate 29 for connection with the negative terminal of said other or smaller capacity cell is earthed by a lead 30 to one of a pair of metal bushes 31 whereby, through the medium of securing bolts 32, the bottom base plate 3 is physically and electrically connected to the flanged ring 4 (see particularly Figures 7, 8 and 2).

The positive terminal 22 is connected by a conductor strip 33 to a spring-loaded plunger contact 34 which engages the underside of the metal plate 7, supported by and insulated from the pillars 8, so that said disc or plate has a potential of four volts. The centre of the plate 7 has an insulating bush 35 in which the tubular stem of the hollow collapsible metal diaphragm 36 is mounted, and the lower end of said stem carries a radial arm 37 which engages the upper end of a contact pin 38 carried by an insulating sleeve in a metal bracket 39 which is secured to the underside of the plate 7. This bracket 39 carries a bi-metallic strip 40 which, when sufficiently heated by the filament 21 below it, bends into contact with the lower end of the pin 38, and so completes the circuit to the diaphragm 36.

A contact point 41 on the upper side of the diaphragm engages a contact strip 42 carried by and insulated from the plate 7, and the free end of this strip 42 is engaged by a pressure adjusting screw 43 which passes through the lamp holder 10 and an insulated bearing 44 carried by the plate 7, the arrangement being such as to electrically connect the lamp holder 11 to the diaphragm 36 through the contacts 41, 42 and screw 43. The negative terminal 45 of the lamp 12 contacts with a conductor strip 46 which connects it to earth or the ring 4 through one of the insulated bolts 8.

Thus when the combined miner's lamp and gas detector is functioning normally the filament 21 is connected directly across the 2 volt supply of one cell 2 and the lamp 12 is connected through the bimetallic strip 40, diaphragm 36 and associated contacts, across the 4 volt supply afforded by the two cells 2 in series.

In the event of an excessive proportion of inflammable gas in the atmosphere a vacuum is created in the combustion chamber and diaphragm 36 so as to cause the latter to collapse and break the contacts 41, 42. The lamp holder 11, however, is connected to one side of a resistance 47, carried by the member 10, and the other side or contact 43 of said resistance engages a conductor strip 49 which is carried by but insulated from the plate 7 and electrically connected by an insulated lead 50 to the stem of the diaphragm 36. Thus when the contacts 41, 42 disengage as a result of the diaphragm 36 collapsing the voltage-dropping resistance 47 continues to pass current to the lamp 12 which will therefore glow or give an appreciably less illumination than normally.

If the dimmed light is insufficient to enable the miner to find his way out of the danger zone he may restore the full illumination by depressing and holding down a spring loaded plunger 51 in the lamp cap 18. Depression of this plunger 51 causes its lower end to depress a further spring-loaded plunger 52, carried by the lamp holder 11, into contact with a metal strip 53 in electrical connection with the plate 7, thereby connecting the lamp holder 11 electrically to said plate 7, which is at 4 volt potential, and cutting out or bridging the resistance 47, diaphragm 36 and bi-metallic switch 40.

Figure 11:
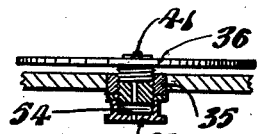
Figure 11 is a detail view of the diaphragm mounting.
Figure 4:
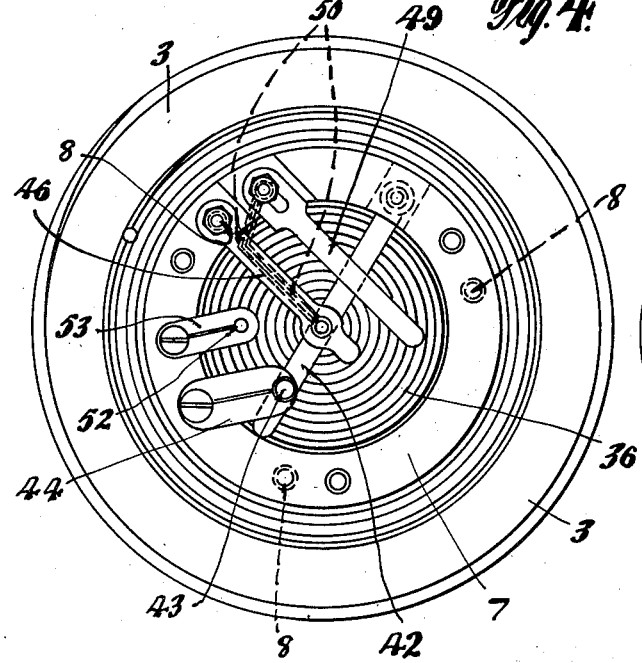
Figure 4 is a plan view taken on the line C. D. of Figure 1.
Figure 6:
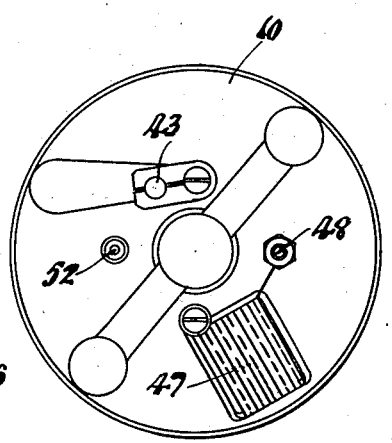

In order to enable the apparatus to be tested in an ordinary atmosphere a porous baffle 54 (see Figure 11) of paper or other appropriate material is inserted between the stem of the diaphragm and a cap 55 thereon, which latter has a fine through orifice, so that diffusion must take place through said baffle 54 before pressure equalisation can take place between the combustion chamber and the interior of the diaphragm. Thus upon switching on for test, the filament 21 first becomes heated and the heat effect upon the bi-metallic strip 40 causes the lamp 12 to be given its full 4 volt supply so as to be brightly illuminated. If now the current is turned off a big vacuum will be created in the combustion chamber and associated diaphragm 36 to break the contacts 41, 42 and upon turning on the current again after an appropriate interval the said current will pass through the resistance 47 to give a dim light in the lamp 12 until the vacuum is destroyed by diffusion through the baffle 54, whereupon the contacts 41, 42 will engage so as to bye-pass the resistance 47 and produce full illumination of the lamp again.

The degree of vacuum required to operate the detector circuit may be controlled by appropriate adjustment of the screw 43 to govern or control the initial pressure on the collapsible diaphragm 36 and so regulate or determine the condition or pressure point at which the circuit through the contacts 41, 42 will be broken.

In the event of the filament 21 breaking or being burnt-out cooling in the combustion chamber would cause the bi-metallic strip 40 to break the circuit of the lamp 12, but by depressing the plunger 52 the circuit of the lamp 12 can be completed again so as to enable this miner to find his way out of the workings.

I claim:

1. An electrical device for indicating the presence of inflammable gases or vapors including a pressure chamber, pressure responsive selective signal means in said pressure chamber, a porous chamber communicating with the pressure chamber, an incandescent filament in the porous chamber for burning combustible gases diffusing into said vessel so as to create a vacuum therein for operating the signal means to indicate the presence of inflammable gases in excess of a predetermined quantity, and means for delaying the equalization of the pressures between the pressure chamber and the porous chamber for testing purposes.

2. An electrical device indicating the presence of inflammable gases or vapors including a diaphragm chamber, a diaphragm in said chamber a porous chamber communicating with the diaphragm chamber, an incandescent filament in the porous chamber for burning combustible gases diffusing into said vessel so as to create a vacuum therein for operating the diaphragm to indicate the presence of inflammable gases in excess of a predetermined quantity, and testing means including a restricted passage communicating the porous chamber with the diaphragm chamber so as to afford delayed equalization of the pressures to give a delayed operation of the diaphragm for testing purposes.

HENRY THOMAS RINGROSE.